United States Patent
Liu et al.

(10) Patent No.: US 11,270,075 B2
(45) Date of Patent: Mar. 8, 2022

(54) GENERATION OF NATURAL LANGUAGE EXPRESSION VARIANTS

(71) Applicant: INTERNATIONAL BUSINESS MACHINES CORPORATION, Armonk, NY (US)

(72) Inventors: Tong Liu, Shaanxi (CN); Kun Yan Yin, Ningbo (CN); Zhong Fang Yuan, Xi'an (CN); He Li, Beijing (CN); Yuan Zhang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 16/670,691

(22) Filed: Oct. 31, 2019

(65) Prior Publication Data

US 2021/0133285 A1 May 6, 2021

(51) Int. Cl.
*G06F 40/295* (2020.01)
*G06N 5/04* (2006.01)
*G06N 20/00* (2019.01)
*G06F 40/30* (2020.01)

(52) U.S. Cl.
CPC ............ *G06F 40/295* (2020.01); *G06F 40/30* (2020.01); *G06N 5/04* (2013.01); *G06N 20/00* (2019.01)

(58) Field of Classification Search
None
See application file for complete search history.

(56) References Cited

U.S. PATENT DOCUMENTS

| 5,369,574 A | 11/1994 | Masegi |
| 6,374,224 B1 | 4/2002 | Horiguchi |
| 9,910,848 B2 | 3/2018 | Beller |
| 11,055,355 B1 * | 7/2021 | Monti ............... G06F 16/90332 |
| 2004/0034520 A1 | 2/2004 | Langkilde-Geary |
| 2008/0270119 A1 | 10/2008 | Suzuki |

(Continued)

FOREIGN PATENT DOCUMENTS

CN 104615755 A 5/2015

OTHER PUBLICATIONS

Lukin et al., "Generating Sentence Planning Variations for Story Telling", aparXiv:1708.08580v1 [cs.CL] Aug. 29, 2017, 11 pages.

(Continued)

*Primary Examiner* — Stella L. Woo
(74) *Attorney, Agent, or Firm* — Dmitry Paskalov

(57) ABSTRACT

Embodiments of the present disclosure relate to generation of natural language expression variants. In an embodiment, a computer-implemented method is disclosed. According to the method, a structured expression is determined for a source expression in a natural language by replacing a source key entity in the source expression with a predetermined symbol. At least one template structured expression is selected from a set of template structured expressions based on respective similarities between the structured expression and respective template structured expressions in the set. Each of the set of template structured expressions comprises the predetermined symbol to represent a key entity. At least one variant expression is generated for the source expression by replacing the predetermined symbol in the at least one selected template structured expression with the source key entity. In other embodiments, a system and a computer program product are disclosed.

18 Claims, 7 Drawing Sheets

(56) References Cited

U.S. PATENT DOCUMENTS

| | | | |
|---|---|---|---|
| 2010/0114927 A1 | 5/2010 | Becker | |
| 2013/0226846 A1 | 8/2013 | Li | |
| 2017/0364520 A1 | 12/2017 | Venkataraman | |
| 2018/0060297 A1* | 3/2018 | Wegryn | G06F 16/3344 |
| 2018/0293302 A1 | 10/2018 | Ko | |
| 2020/0184959 A1* | 6/2020 | Yasa | G10L 15/1815 |

OTHER PUBLICATIONS

Mell et al., "The NIST Definition of Cloud Computing", National Institute of Standards and Technology, Special Publication 800-145, Sep. 2011, 7 pages.

International Search Report and Written Opinion of International Application No. PCT/IB2020/059710, dated Jan. 27, 2021, 10 pages.

Liu et al., "Generation of Natural Language Expression Variants," Application and Drawings, Filed on Oct. 15, 2020, 34 Pages, Related International Application No. PCT/IB2020/059710.

* cited by examiner

GENERATION OF NATURAL LANGUAGE EXPRESSION VARIANTS

BACKGROUND

The present invention relates to natural language processing techniques, and more specifically, to generation of natural language expression variants.

With development of technologies, the use of natural language processing has expanded to encompass a wide variety of applications, examples of which include sentence generation may be used to enable human-computer dialogue, question-answering, intent recognition, report creation, automatic technical documentation, customized instructions, item and event descriptions, tutorials, and stories. Machine learning or deep learning models are widely used to improve the natural language processing tasks.

SUMMARY

According to one embodiment of the present invention, there is provided a computer-implemented method. According to the method, a structured expression is determined for a source expression in a natural language by replacing a source key entity in the source expression with a predetermined symbol. At least one template structured expression is selected from a set of template structured expressions based on respective similarities between the structured expression and respective template structured expressions in the set. Each of the set of template structured expressions comprises the predetermined symbol to represent a key entity. At least one variant expression is generated for the source expression by replacing the predetermined symbol in the at least one selected template structured expression with the source key entity.

According to a further embodiment of the present invention, there is provided a system. The system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
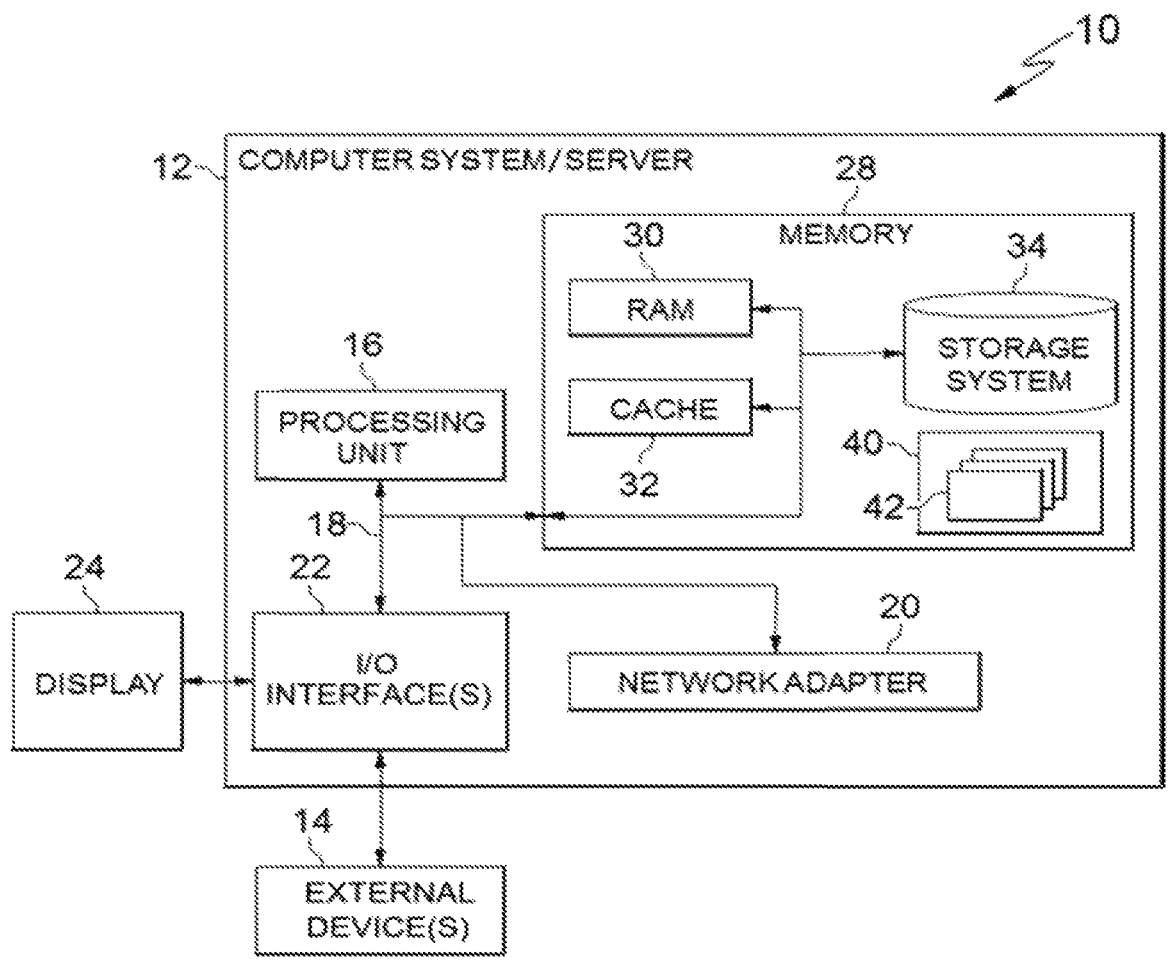
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
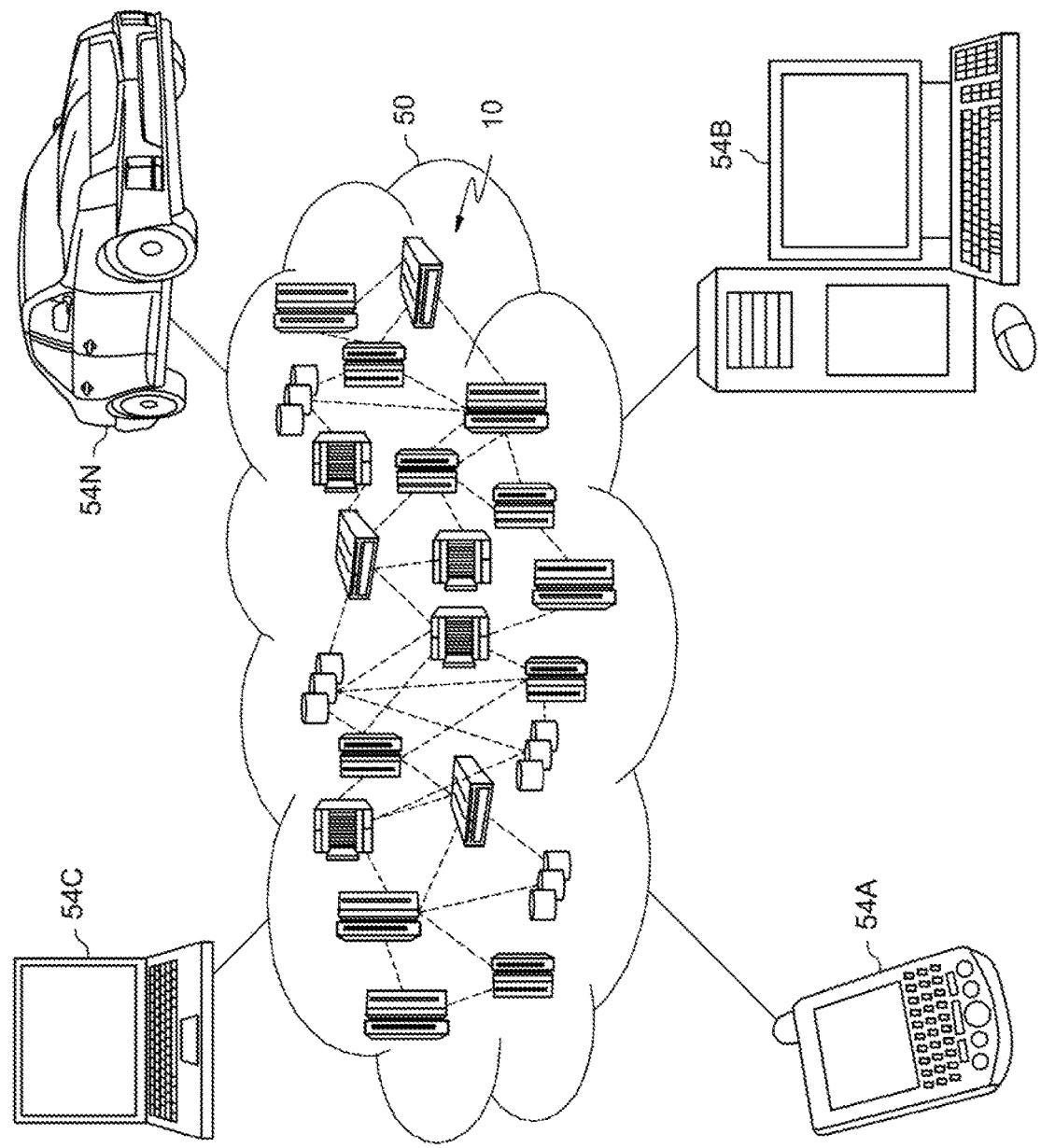
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
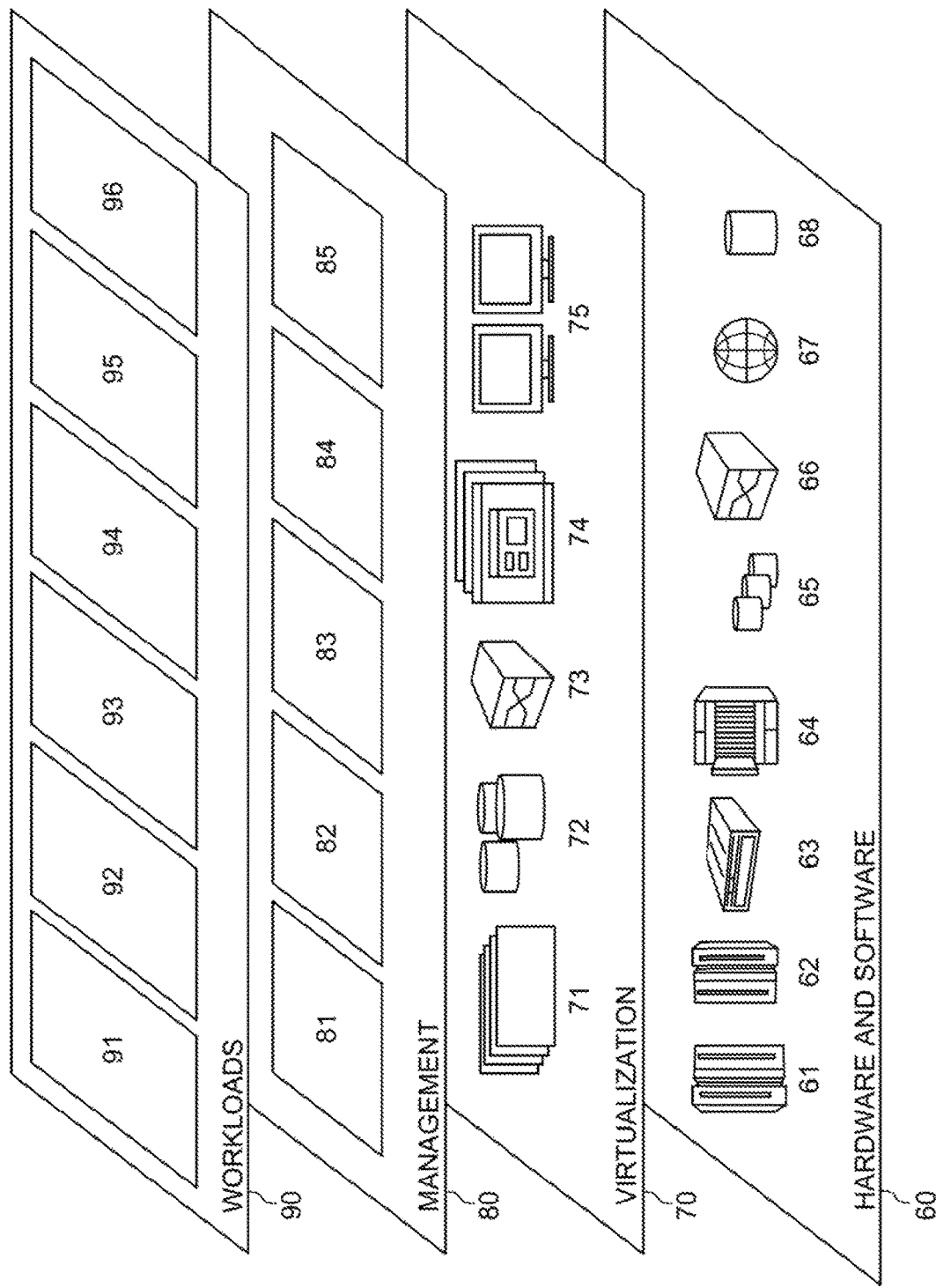
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation of natural language expression variants 96. The functionalities of generation of natural language expression variants 96 will be described in the following embodiment of the present disclosure.

In training or testing the models, a number of semantically equivalent sentences or expressions may be required. For example, since intent may be expressed in various natural language expressions, a large number of intent variants are generally a must to build an intent recognition model. For example, an intent "How to treat gastritis" could be expressed using different variations such as "What secret recipe does gastritis have to treat?", "I got gastritis, how to do", "How is gastritis treated", "How to cure gastritis". The more the variants are used in the model building, the more accuracy the model is.

Therefore, there exists a need to generate variants for a natural language expression in natural language processing applications. Conventional solutions require manual preparation of sufficient variants for an expression. However, collecting high-quality variants is a labor-intensive, time-consuming, and error prone activity. Thus, it is desired to provide an automatic mechanism for generating variants.

According to embodiments of the present invention, there is provided a solution for automated generation of natural language expression variants. In this solution, a key entity in a source expression is replaced by a predetermined symbol to obtain a structured expression. One or more template structured expressions are prepared and available for selection, each of which include the same predetermined symbol to represent a key entity. If one or more template structured expressions are similar to the structured expression of the source expression, for example, have similarities higher than a threshold similarity, the one or more template structured expressions are selected for generating variants for the source expression. Specifically, the variants for the source expression are generated by replacing the predetermined symbol in the one or more selected template structured expressions with the key entity in the source expression.

Through this solution, a number of variants can be obtained in an automated way, thereby achieving improved efficiency and accuracy as compared with the manual preparation.

Figure 4:
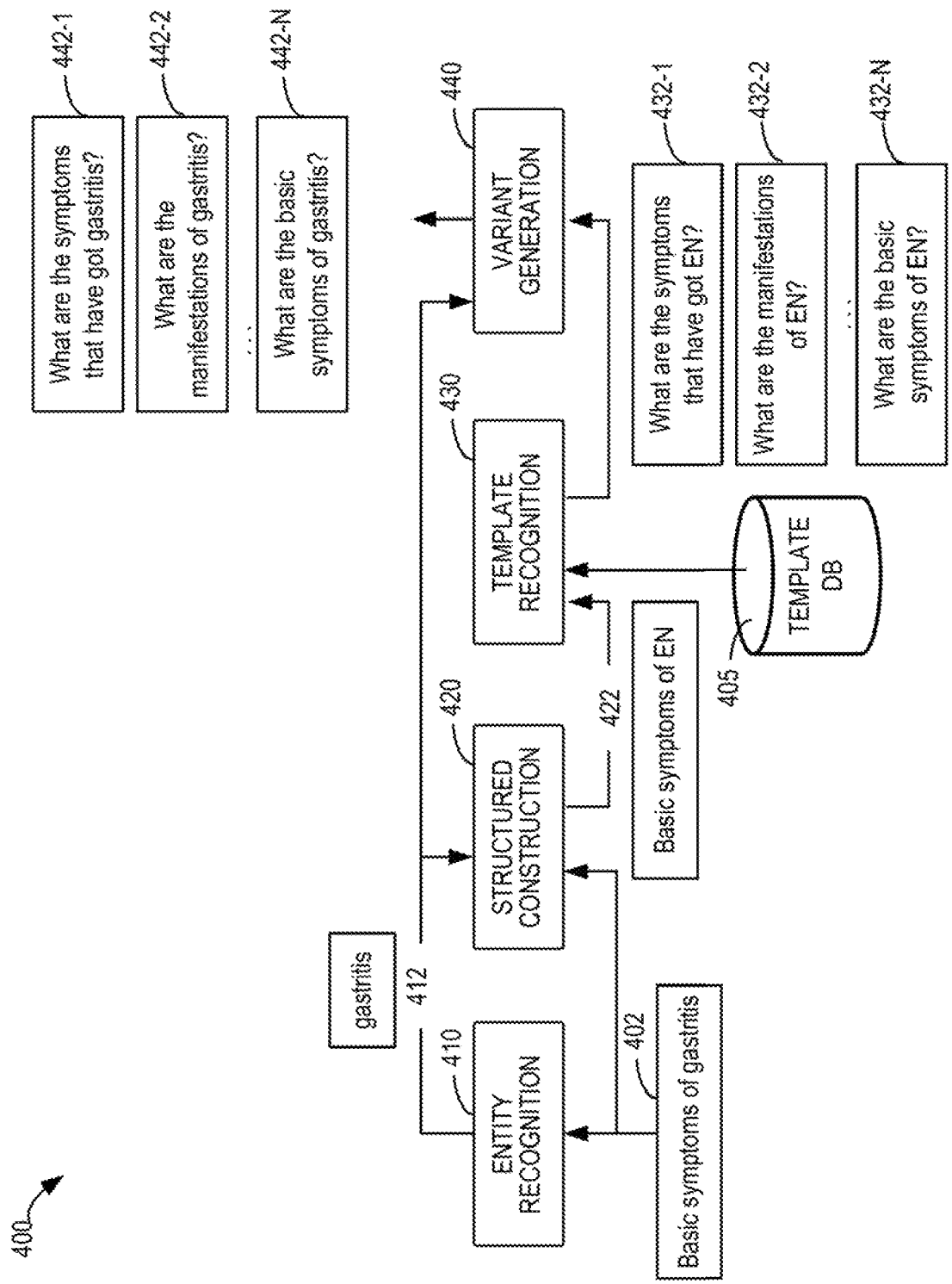
FIG. 4 depicts a block diagram of an example system for generating natural language expression variants according to an embodiment of the present invention.

Embodiments of the present invention will be described with reference to the accompanying figures. Reference is first made to FIG. 4, which shows a block diagram of an example system 400 for generating natural language expression variants according to an embodiment of the present invention. The system 400 includes a plurality of modules for implementing a plurality of stages in generating one or more variant expressions for a source expression.

It would be appreciated that the modules of the system 400 shown in FIG. 4 may be implemented as one or more software engines, components, or the like, which are configured with logic for implementing the functionality attributed to the particular module. Each module may be implemented using one or more of such software engines, components or the like. The software engines, components, etc. are executed on one or more processors of one or more computing systems or devices and utilize or operate on data stored in one or more storage devices, memories, or the like, on one or more of the computing systems.

In some embodiments, different modules of the system 400 may be implemented as a single module, and a single module of the system 400 may be separated as more than one module. In some embodiments, one or more further modules may be included into the system 400. It would be appreciated that the expressions shown in FIG. 4 and discussed below are provided as specific examples merely for purpose of illustration. The embodiments of the present invention can be applied to process any other natural language expressions.

As shown, the system 400 includes an entity recognition module 410 configured to obtain a source expression 402 in a natural language and identify/recognize a key entity 412 (referred to as a "source key entity") in the source expression 402. The source expression 402 may be in form of any natural langue and consists of one or more words, characters, or other language units. The expression 402 may be a sentence, a phrase, a text string, or the like. There is no limitation on the length and specific content on the source expression 402 to be processed. Since it is expected to generate one or more variants for the source expression 402 in the present disclosure, the source expression 402 may also be referred to as a seed expression or simply a seed. In the shown example, the source expression 402 is an English phrase "Basic symptoms of gastritis."

The source key entity 412 may be expressed using one or more words, characters, or other language units contained in the source expression 402. A key entity in an expression may be a core entity for intent of an expression, which may be a terminology in a field, a named entity, or any other important words/characters in the source expressions. The source key entity 412 is a key entity in the source expression 402. In the shown example, a source key entity "gastritis" 412 is recognized from the example source expression 402. In some embodiments, more than one source key entity 412 may be recognized from the source expression 402. Various entity recognition techniques may be applied to identify the source key entity 412. Some example embodiments for the key entity recognition will be described in detail below with reference to FIG. 5.

The source key entity 412 and the source expression 402 are provided to a structured construction module 420 included in the system 400, which is configured to change the source expression 402 into a structured expression 422 by replacing the source key entity 412 in the source expression 402 with a predetermined symbol. For purpose of illustration only, the predetermined symbol is "EN" in the example of FIG. 4, and then the source expression 402 may be modified to be a structured expression 422 "Basic symptoms of EN." The predetermined symbol may be any common symbol which is also used to construct other structured expressions. To avoid potential confusion, the predetermined symbol may be selected as a textual symbol, a computer symbol, an abbreviation and/or any other types of representation that may be rarely occurred in expressions of a natural language. There is no specific limitation on the symbol for replacing the key entity.

In the embodiments where more than one source key entity 412 is recognized from the source expression 402, the same predetermined symbol may be used to replace those source key entities (for example, if those key entities are in a coordinating relation) or different predetermined symbols may be used to replace different source key entities.

The system 400 also includes a template recognition module 430 which is configured to determine whether there is one or more available template structured expressions similar to the structured expression 422 and select the similar template structured expressions for generating variants for the source expression 402. A set of template structured expressions may be stored in a template database 405 which is accessible to the template recognition module 430. The set of template structured expressions may also be referred to as a library of template structured expressions. The template structured expressions may be collected from various sources or corpora and processed to each include the predetermined symbol(s) (such as "EN") to represent one or more key entities contained therein.

In a natural language, there are relatively fixed sentence structures that can be used to construct various expressions although the specific key entities contained in those expressions may be different. By preprocessing available natural language expressions to ignore the key entities using the predetermined meaningless symbol, the structures of the expressions can be used as templates for generating different forms of expressions. For example, by searching from web pages, database, dictionaries, and/or other sources, some available expressions, such as "What are the symptoms of chronic pharyngitis," "What are the manifestations of flu," "What are the basic symptoms of inflammatory bowel disease," and so on are found. Template structured expressions may be obtained by replacing the key entities in those expressions, such as "chronic pharyngitis," "flu," and "inflammatory bowel disease," with the predetermined symbol, such as "EN."

To find a similar template structured expression for the structured expression 422, the template recognition module 430 determines respective similarities between the structured expression 402 and the respective template structured expressions stored in the template database 405. A similarity between two structured expressions may be determined in various methods utilized for measuring similarity between normal sentences/expression except that the predetermined symbol contained in the structured expressions can be regarded as being the same. In some embodiments, structure similarities between the structured expression 402 and the template structured expressions are taken into account. The structures of those expressions become more obvious after replacing the key entities contained therein with the same symbols. In some embodiments, semantics of key words/phrases included in the structured expression 422 and the template structured expressions may also be considered to make sure that similar structured expressions include the same or similar key words/phrases.

The template recognition module 430 may compare the calculated respective similarities with a threshold similarity (for convenience of discussion, referred to as a "first threshold similarity). The first threshold similarity may be set according to actual requirement on the final variants. If one or more of the similarities exceed the first threshold similarity, the corresponding template structured expressions may be selected for generating variants for the source expression 402. In the example of FIG. 4, as shown, N template structured expressions are selected from the template database 405, at least including a template structured expression 432-1"What are the symptoms of EN," a template structured expression 432-2 "What are the manifestations of EN," and a template structured expression 432-N "What are the basic symptoms of EN." The selected template structured expressions 431-1, 432-2, . . . , 432-N similar to the structured expression 422 may be collectively or individually referred to as template structured expressions 432.

In some embodiments, to further reduce the computing delay, template structured expressions stored in the template database 405 may be first classified or clustered into a plurality of groups, each including one or more similar template structured expressions. Any clustering or classification methods, such as the k-means algorithm, the k-means++algorithm, a density-based clustering method, and/or the like, may be applicable for classifying the template structured expressions.

Upon receiving the structured expression 422 of the source expression 402, the template recognition module 430 may calculate coarse similarities between the structured expression 422 and one of the template structured expressions in each group (such as the one at the cluster centroid), and select one or more groups that have higher similarities with the structured expression 422 (the top-K group, where K is greater than or equal to one). In this way, a great portion of the dissimilar template structured expressions may be filtered out to reduce the calculation consumption. The template recognition module 430 may further calculate fine similarities between the structured expression 422 and each template structured expression included in the selected group(s). The fine similarities may then be compared with the first threshold similarity to select the similar template structured expression 432 for the structured expression 422.

The similar template structured expressions 432 are provided to a variant generation module 440 included in the system 400 which is configured to generate one or more variant expressions for the source expression 402 by replacing the predetermined symbol in the at least one template structured expression 432 with the source key entity 412. As an example, by replacing the predetermined symbol "EN" with the source key entity "gastritis" 412 determined from the source expression 402, the template structured expressions 432-1 to 432-N are changed to be a variant expression 442-1 "What are the symptoms of gastritis," a variant expression 442-2 "What are the manifestations of gastritis," a variant expression 442-N "What are the basic symptoms of gastritis," which are collectively or individually referred to as variant expressions 442. Since the structured expressions are similar and the exact source key entity for the source expression 402 is embedded into the similar template structured expressions, the generated variant expressions 442 can have substantially the same intent with the source expression 402 and may be semantically equivalent or similar to the source expression 402.

It would be appreciated that the template structured expressions may be in the same natural language of the source expression 402. If it is expected to generate variants for some source expression in a different natural language than the template structured expression, the source expression may be first translated into an expression in that language, for example, by means of a language translation model. The final variants may be translated back to the language of the source expression.

Figure 5:
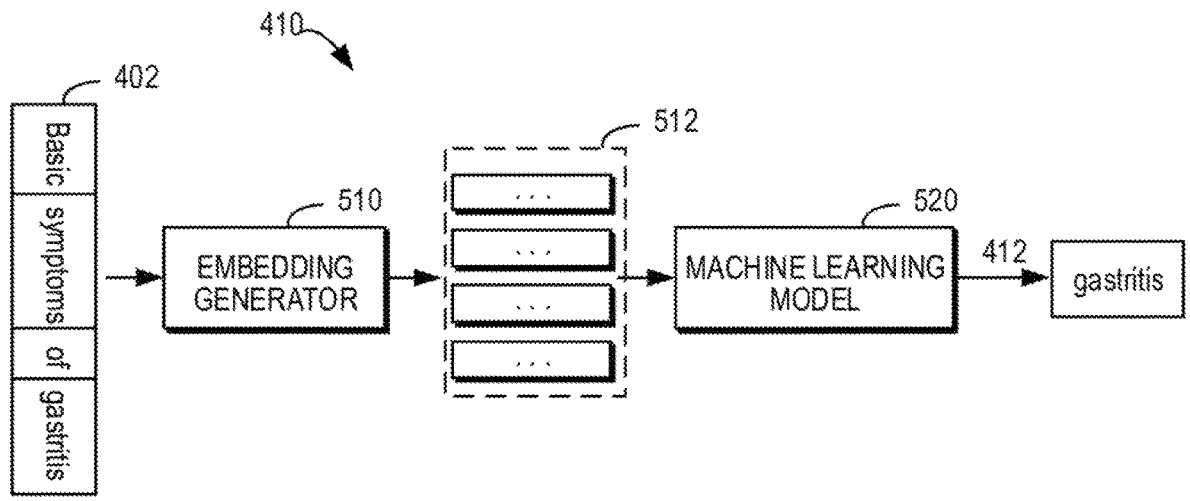
FIG. 5 depicts a block diagram of an example of the entity recognition module in the system of FIG. 4 according to an embodiment of the present invention.

FIG. 5 depicts a block diagram of an example of the entity recognition module 410 of the system 400 according to an embodiment of the present invention. In this example, the entity recognition module 410 applies a trained machine learning model for identifying the source key entity 412 from the source expression 402.

In the entity recognition, the source expression 402 may be converted into tokens. Each token is a continuous sequence of characters grouped together, which may be sub-words, words, punctuation, or parts of speech such as (but not limited to) comma, hyphen, slash, or apostrophe. In some embodiments, each token may be the smallest unit in the expression. For example, the source expression 402 "Basic symptoms of gastritis" may be tokenized to be "Basic," "symptoms," "of," "gastritis," where each word is a token.

The entity recognition module 410 includes an embedding generator 510 to vectorize the source expression 402 or the tokens of the source expression 402 with respective embeddings 512, each embedding including a vector of a certain dimension. Vectorization or embeddings are commonly used in natural language processing. There are various available methods that can be employed to obtain embeddings of an expression. In an example, the embedding generator 510 may randomly assign numerical values within a certain range (for example, −1 to 1) to each token of the source expression 402. It would be appreciated that other embeddings may also be feasible.

The embeddings 512 of the source expression 402 is provided as an input to a machine learning model 520 for entity recognition, so as to recognize the source key entity 412. The machine learning model 520 is pre-trained using a training dataset. The machine learning model 520 may be any type of machine learning or deep learning models for entity recognition, some examples of which may include Bidirectional-Long Short-Term Memory (Bi-LSTM) model, a Conditional Random Field (CRF) model, a Bi-LSTM-CRF model, and any other types of models or neural networks. Those models are widely used for natural language processing and their working principles are known to those skilled in the art.

The machine learning model 520 may be trained for entity recognition for a specific field of application by using a training dataset related to this specific field or may be trained as a general key entity recognition model for different fields of applications by using a training dataset related to all those fields. By using the trained machine learning model 520, it is possible to identify the source key entity 412 in a more efficient and accurate manner.

Although the entity recognition of the source expression 402 is described, the same or similar recognition method may be applied to recognize key entities when preparing the template structured expressions in the template database 405.

Figure 6:
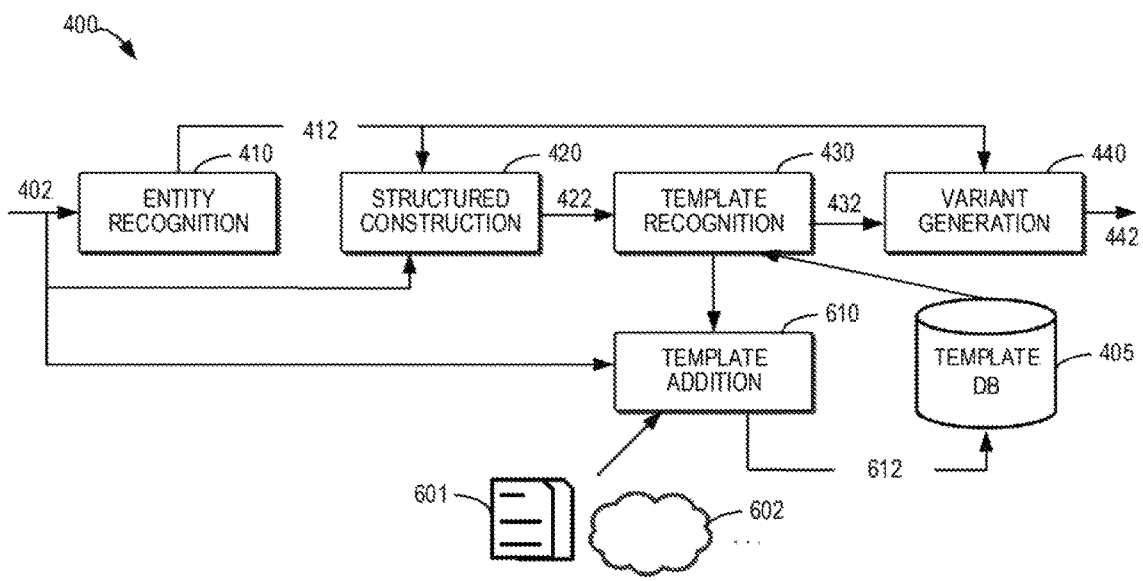
FIG. 6 depicts a block diagram of an example system for generating natural language expression variants according to another embodiment of the present invention.

In the embodiments described above, one or more template structured expressions 432 having similarities higher than the first threshold similarity can be selected from the template database 405 for generating variant expressions for the source expression 402. In some cases, there may be none or a few template structured expressions 432 having similarities higher than the first threshold similarity in the template database 405. To provide sufficient variant expressions, in some embodiments, the system 400 may be configured to add more template structured expression into the template database 405 in this case. FIG. 6 depicts a block diagram of an example of the system 400 in such embodiments. For clarity, the example expressions in the different stages of processing are not shown in FIG. 6.

As shown, the system 400 further includes a template addition module 610. The template addition module 610 is configured to search for one or more further template structured expressions 612 based on the source expression 402 and then add the one or more further template structured expressions 612 into the template database 405 for future use. The template structured expressions may be found from any predetermined corpus, including books, dictionaries 601, the Internet 602, and the like. By dynamically triggering the addition of the template structured expressions, the template database 405 may be enriched on demand as the use of the system 400.

The template addition module 610 may be triggered by the template recognition module 430 if it is determined that the number of similar template structured expressions for the structured expression 422 (those having higher similarities with the structured expression 422 than the first threshold similarity) is lower than a threshold number. The threshold number may be configurable, which can be set as a value indicating the lowest requirement on the number of variant expressions for the source expression 402. For example, if there is no similar template structured expression or only a few template structured expressions for the structured expression 422, the template addition module 610 may be triggered to find and add more template structured expressions 612 based on the source expression 402.

Figure 7:
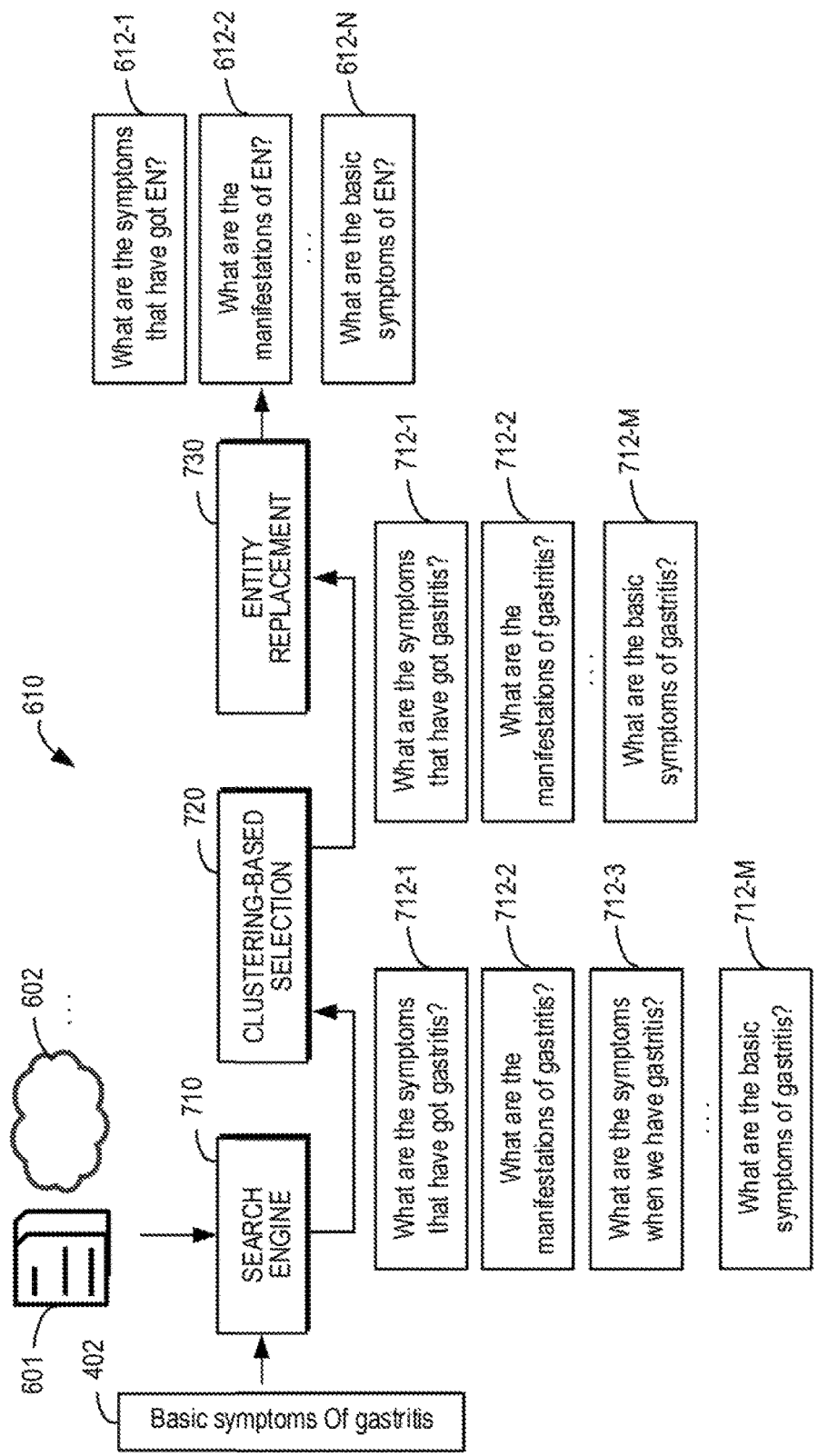
FIG. 7 depicts a block diagram of an example of the template addition module in the system of FIG. 6 according to an embodiment of the present invention.

FIG. 7 depicts a block diagram of an example of the template addition module 610 in the system of FIG. 6. The template addition module 610 includes a search engine 710 to search, from one or more corpora 601, 602, for expressions that are similar to the source expression 402. In performing the search, the search engine 710 may calculate semantic similarities between the source expression 402 and expressions contained in the corpora. The search engine 710 may obtain one or more raw expressions in the same natural language as the source expression 402. Those raw expressions have relatively higher similarities with the source expression 402 and usually contain at least the source key entity 412 (the word "gastritis" in the above example).

As some examples, the raw expressions obtained by the search engine 710 may include an expression 712-1 "What are the symptoms of gastritis," an expression 712-2 "What are the manifestations of gastritis," an expression 712-3 "What are the symptoms when we have gastritis," and an expression 712-M "What are the basic symptoms of gastritis." The raw expressions 712-1, 712-2, 712-3, . . . , 712-M may be collectively or individually referred to as raw expressions 712.

The template structured expressions 612 may be determined from those raw expressions 712. In some embodiments, when the scales of the corpora 601, 602 are large, a large amount of similar raw expressions may be obtained, some of which may have only slight differences. To reduce the storage consumption and avoid generating too many redundant variants for a source expression, in some embodiments, some raw expressions may be filtered out for constructing the template structured expressions.

Specifically, the template addition module 610 includes a clustering-based selection module 720 which is configured to cluster the raw expressions 712 into a plurality of groups of raw expressions and then select raw expressions based on the clustering result. Each of the plurality of groups includes at least one of the raw expressions 712. Any clustering or classification methods, such as the k-means algorithm, the k-means++algorithm, a density-based clustering method, and/or the like, may be applicable for the clustering. During the clustering, the raw expressions may be converted into vectors to allow calculation of similarities. The clustering-based selection module 720 may select respective raw expressions from the plurality of groups of raw expressions. One raw expression may be selected from each of the groups, such as the one at the center or centroid of the group. For example, the raw expressions 712-1, 712-2, and 712-M are selected while other similar raw expressions, such as the raw expression 712-3, are discarded.

Then, the clustering-based selection module 720 generates a plurality of further template structured expressions by replacing the source key entity 412 in the selected raw expressions 712 with the predetermined symbol. As an example, the template structured expressions include a template structured expression 612-1 "What are the symptoms of EN," a template structured expression 612-2 "What are the manifestations of EN," a template structured expression 612-N "What are the basic symptoms of EN." It is noted that it is assumed those template structured expressions 612 are not included in the template database 405 when the template recognition module 430 performs the template searching for the database.

In some embodiments, the template addition module 610 may further cause one or more of the raw expressions 712, especially those raw expressions that are selected for generating the template structured expressions 612, to be provided as at least one variant expression for the source expression 402. As such, not only the template database 405 includes more templates, more variants for the source expression 402 can be provided for future use.

Figure 8:
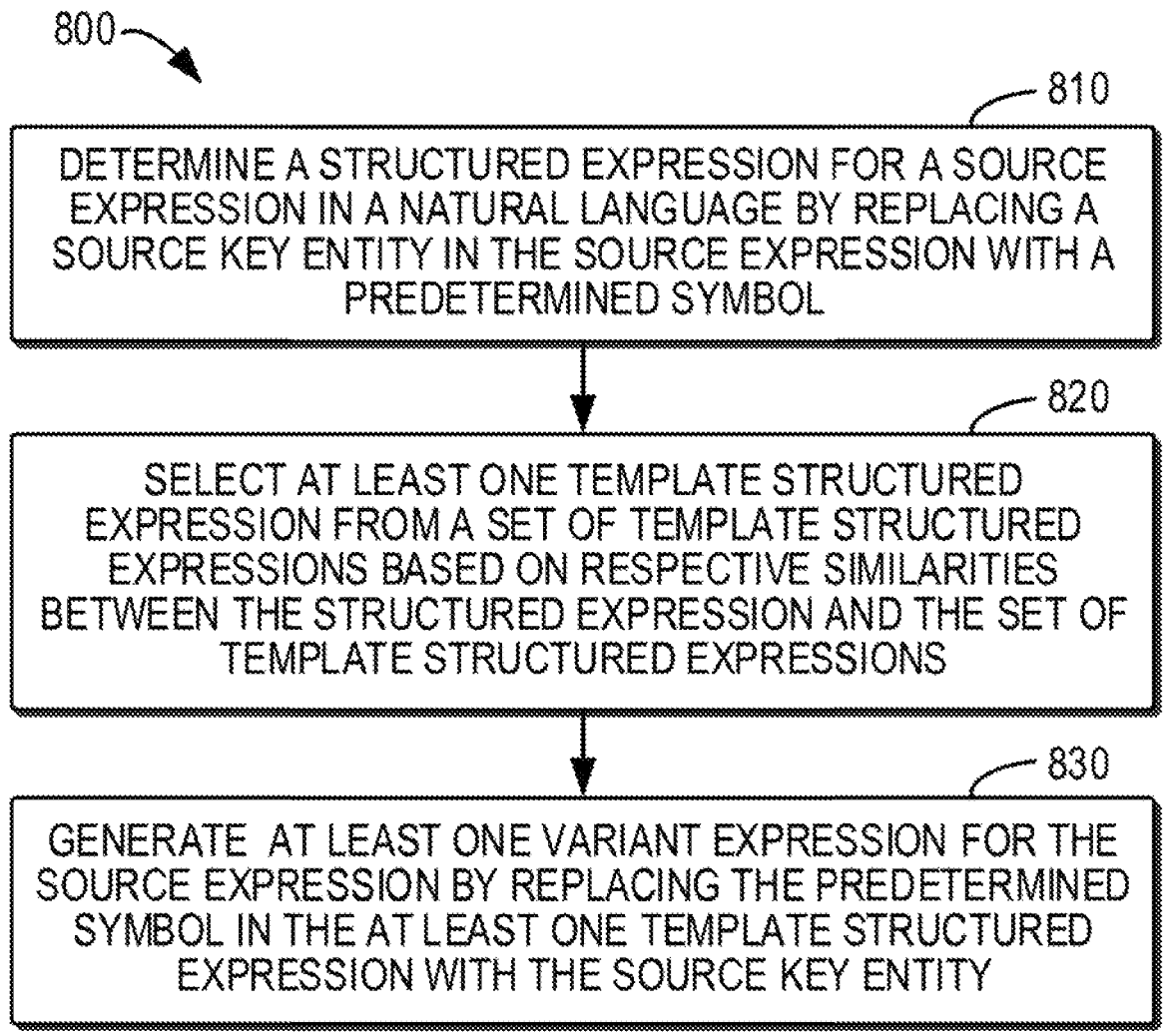
FIG. 8 depicts a flowchart of an example method according to an embodiment of the present invention.

FIG. 8 shows a flowchart of an example method 800 according to an embodiment of the present disclosure. The method 800 can be implemented at the system 400 as shown in FIG. 4. For purpose of illustration, the method 800 is described with reference to FIG. 4.

At block 810, the system 400 determines a structured expression for a source expression in a natural language by replacing a source key entity in the source expression with a predetermined symbol. At block 820, the system 400 selects at least one template structured expression from a set of template structured expressions based on respective similarities between the structured expression and respective template structured expressions in the set. Each template structured expression comprises the predetermined symbol to represent a key entity. At block 830, the system 400 generates at least one variant expression for the source expression by replacing the predetermined symbol in the at least one template structured expression with the source key entity.

In some embodiments, selecting the at least one template structured expression comprises: comparing the respective similarities with a first threshold similarity; and in response to a similarity of the respective similarities between the structured expression and at least one of the respective template structured expressions in the set exceeding a first threshold similarity, selecting the at least one template structured expression.

In some embodiments, the method 800 further includes determining the number of template structured expressions that have higher similarities with the structured expression than the first threshold similarity; in response to the determined number being smaller than a threshold number, obtaining, from a predetermined corpus, at least one raw expression in the natural language that has a higher similarity with the source expression than a second similarity threshold, the at least one expression comprising the source key entity; and generating at least one further template structured expression based on the at least one raw expression.

In some embodiments, a plurality of raw expressions are obtained, and wherein generating the at least one further template structured expression comprises: clustering the plurality of raw expressions into a plurality of groups of raw expressions, each of the plurality of groups comprising at least one of the plurality of raw expressions; selecting respective raw expressions from the plurality of groups of raw expressions; and generating a plurality of further template structured expressions by replacing the source key entity in the selected raw expressions with the predetermined symbol.

In some embodiments, the method 800 further includes providing at least one of the selected raw expressions as at least one variant expression for the source expression.

In some embodiments, the respective similarities are based at least in part on structure similarities between the structured expression and the respective template structured expressions in the set.

In some embodiments, the method 800 further includes identifying the source key entity from the source expression based on a trained machine learning model for entity recognition.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating natural language expression variants, the method comprising:
   determining, by one or more processors, a structured expression for a source expression in a natural language by replacing a source key entity in the source expression with a predetermined symbol;
   selecting, by the one or more processors, at least one template structured expression from a set of template structured expressions based on respective similarities between the structured expression and respective template structured expressions in the set, each of the set of template structured expressions comprising the predetermined symbol to represent a key entity;
   generating, by the one or more processors, at least one variant expression for the source expression by replacing the predetermined symbol in the at least one selected template structured expression with the source key entity;
   determining, by the one or more processors, a number of template structured expressions that have higher similarities with the structured expression than the first threshold similarity;
   in response to the determined number being smaller than a threshold number, obtaining, by one or more processors and from a predetermined corpus, at least one raw expression in the natural language that has a higher similarity with the source expression than a second similarity threshold, the at least one expression comprising the source key entity; and
   generating, by the one or more processors, at least one further template structured expression based on the at least one raw expression.

2. The method of claim 1, wherein selecting the at least one template structured expression comprises:
   comparing, by the one or more processors, the respective similarities with a first threshold similarity; and
   in response to a similarity of the respective similarities between the structured expression and at least one of the respective template structured expressions in the set exceeding a first threshold similarity, selecting, by one or more processors, the at least one template structured expression.

3. The method of claim 1, wherein a plurality of raw expressions are obtained, and wherein generating the at least one further template structured expression comprises:
   clustering, by the one or more processors, the plurality of raw expressions into a plurality of groups of raw expressions, each of the plurality of groups comprising at least one of the plurality of raw expressions;
   selecting, by the one or more processors, respective raw expressions from the plurality of groups of raw expressions; and
   generating, by the one or more processors, a plurality of further template structured expressions by replacing the source key entity in the selected raw expressions with the predetermined symbol.

4. The method of claim 1, further comprising:
   providing, by the one or more processors, at least one of the selected raw expressions as at least one variant expression for the source expression.

5. The method of claim 1, wherein the respective similarities are based at least in part on structure similarities between the structured expression and the respective template structured expressions in the set.

6. The method of claim 1, further comprising:
   identifying, by the one or more processors, the source key entity from the source expression based on a trained machine learning model for entity recognition.

7. The system of claim 1, wherein a plurality of raw expressions is obtained, and wherein generating the at least one further template structured expression comprises:
   clustering the plurality of raw expressions into a plurality of groups of raw expressions, each of the plurality of groups comprising at least one of the plurality of raw expressions;
   selecting respective raw expressions from the plurality of groups of raw expressions; and
   generating a plurality of further template structured expressions by replacing the source key entity in the selected raw expressions with the predetermined symbol.

8. The system of claim 1, wherein the acts further comprise:
   providing at least one of the selected raw expressions as at least one variant expression for the source expression.

9. A system comprising:

a processing unit; and a memory coupled to the processing unit and storing instructions thereon, the instructions, when executed by the processing unit, performing acts comprising:

determining a structured expression for a source expression in a natural language by replacing a source key entity in the source expression with a predetermined symbol;

selecting at least one template structured expression from a set of template structured expressions based on respective similarities between the structured expression and respective template structured expressions in the set, each of the set of template structured expressions comprising the predetermined symbol to represent a key entity;

generating at least one variant expression for the source expression by replacing the predetermined symbol in the at least one selected template structured expression with the source key entity;

determining, by the one or more processors, a number of template structured expressions that have higher similarities with the structured expression than the first threshold similarity;

in response to the determined number being smaller than a threshold number, obtaining, by one or more processors and from a predetermined corpus, at least one raw expression in the natural language that has a higher similarity with the source expression than a second similarity threshold, the at least one expression comprising the source key entity; and generating, by the one or more processors, at least one further template structured expression based on the at least one raw expression.

10. The system of claim 9, wherein selecting the at least one template structured expression comprises:

comparing the respective similarities with a first threshold similarity; and in response to a similarity of the respective similarities between the structured expression and at least one of the respective template structured expressions in the set exceeding a first threshold similarity, selecting the at least one template structured expression.

11. The system of claim 9, wherein the respective similarities are based at least in part on structure similarities between the structured expression and the respective template structured expressions in the set.

12. The system of claim 9, wherein the acts further comprise:

identifying the source key entity from the source expression based on a trained machine learning model for entity recognition.

13. A computer program product being tangibly stored on a non-transient machine-readable medium and comprising machine-executable instructions, the instructions, when executed on a device, causing the device to perform acts comprising:

determining a structured expression for a source expression in a natural language by replacing a source key entity in the source expression with a predetermined symbol;

selecting at least one template structured expression from a set of template structured expressions based on respective similarities between the structured expression and respective template structured expressions in the set, each of the set of template structured expressions comprising the predetermined symbol to represent a key entity;

generating at least one variant expression for the source expression by replacing the predetermined symbol in the at least one selected template structured expression with the source key entity;

determining a number of template structured expressions that have higher similarities with the structured expression than the first threshold similarity;

in response to the determined number being smaller than a threshold number, obtaining, from a predetermined corpus, at least one raw expression in the natural language that has a higher similarity with the source expression than a second similarity threshold, the at least one expression comprising the source key entity; and generating at least one further template structured expression based on the at least one raw expression.

14. The computer program product of claim 13, wherein selecting the at least one template structured expression comprises:

comparing the respective similarities with a first threshold similarity; and in response to a similarity of the respective similarities between the structured expression and at least one of the respective template structured expressions in the set exceeding a first threshold similarity, selecting the at least one template structured expression.

15. The computer program product of claim 13, wherein a plurality of raw expressions is obtained, and wherein generating the at least one further template structured expression comprises:

clustering the plurality of raw expressions into a plurality of groups of raw expressions, each of the plurality of groups comprising at least one of the plurality of raw expressions;

selecting respective raw expressions from the plurality of groups of raw expressions; and generating a plurality of further template structured expressions by replacing the source key entity in the selected raw expressions with the predetermined symbol.

16. The computer program product of claim 13, wherein the acts further comprise:

providing at least one of the selected raw expressions as at least one variant expression for the source expression.

17. The computer program product of claim 13, wherein the respective similarities are based at least in part on structure similarities between the structured expression and the respective template structured expressions in the set.

18. The computer program product of claim 13, wherein the acts further comprise:

identifying the source key entity from the source expression based on a trained machine learning model for entity recognition.

* * * * *